United States Patent
Krogh

(10) Patent No.: US 9,811,093 B2
(45) Date of Patent: Nov. 7, 2017

(54) FLIGHT TRAJECTORY COMPENSATION SYSTEM FOR AIRSPEED VARIATIONS

(75) Inventor: Steven Barry Krogh, Issaquah, WA (US)

(73) Assignee: THE BOEING COMPANY, Chicago, IL (US)

( * ) Notice: Subject to any disclaimer, the term of this patent is extended or adjusted under 35 U.S.C. 154(b) by 1512 days.

(21) Appl. No.: 13/078,086

(22) Filed: Apr. 1, 2011

(65) Prior Publication Data

US 2012/0248260 A1    Oct. 4, 2012

(51) Int. Cl.
*B64C 3/18* (2006.01)
*B64C 13/16* (2006.01)
*B64C 17/00* (2006.01)
*G05D 1/06* (2006.01)

(52) U.S. Cl.
CPC ................... *G05D 1/0607* (2013.01)

(58) Field of Classification Search
CPC ......... B64C 13/16; G05D 1/00; G05D 1/0607
USPC .................. 244/180–182, 185, 186; 701/5–7
See application file for complete search history.

(56) References Cited

U.S. PATENT DOCUMENTS

| | | | |
|---|---|---|---|
| 2,816,724 | A | 12/1957 | Snodgrass |
| 3,269,675 | A | 8/1966 | Poliak et al. |
| 3,738,594 | A | 6/1973 | Donovan et al. |
| 4,261,537 | A | 4/1981 | Tisdale, Sr. et al. |
| 4,617,633 | A | 10/1986 | McAllister |
| 5,823,479 | A | 10/1998 | Nield et al. |
| 7,871,217 | B2 | 1/2011 | Kennedy et al. |
| 2008/0138144 | A1 | 6/2008 | Kennedy et al. |
| 2009/0132104 | A1 | 5/2009 | Rupnik et al. |
| 2009/0157239 | A1 | 6/2009 | Walton et al. |

OTHER PUBLICATIONS

EP Search report dated Jul. 9, 2012 regarding application 12162904.2-2206, applicant's reference P54198EP/RGBH, applicant The Boeing Company, 8 pages.

*Primary Examiner* — Philip J Bonzell
(74) *Attorney, Agent, or Firm* — Yee & Associates, P.C.

(57) ABSTRACT

A method and apparatus for controlling a flight of an aircraft. An undesired change in an airspeed for the aircraft is identified. A number of commands for a flight control system associated with a wing of the aircraft are identified in response to the undesired change in the airspeed. The number of commands is configured to cause the flight control system to maintain a lift of the aircraft for a desired trajectory.

9 Claims, 7 Drawing Sheets

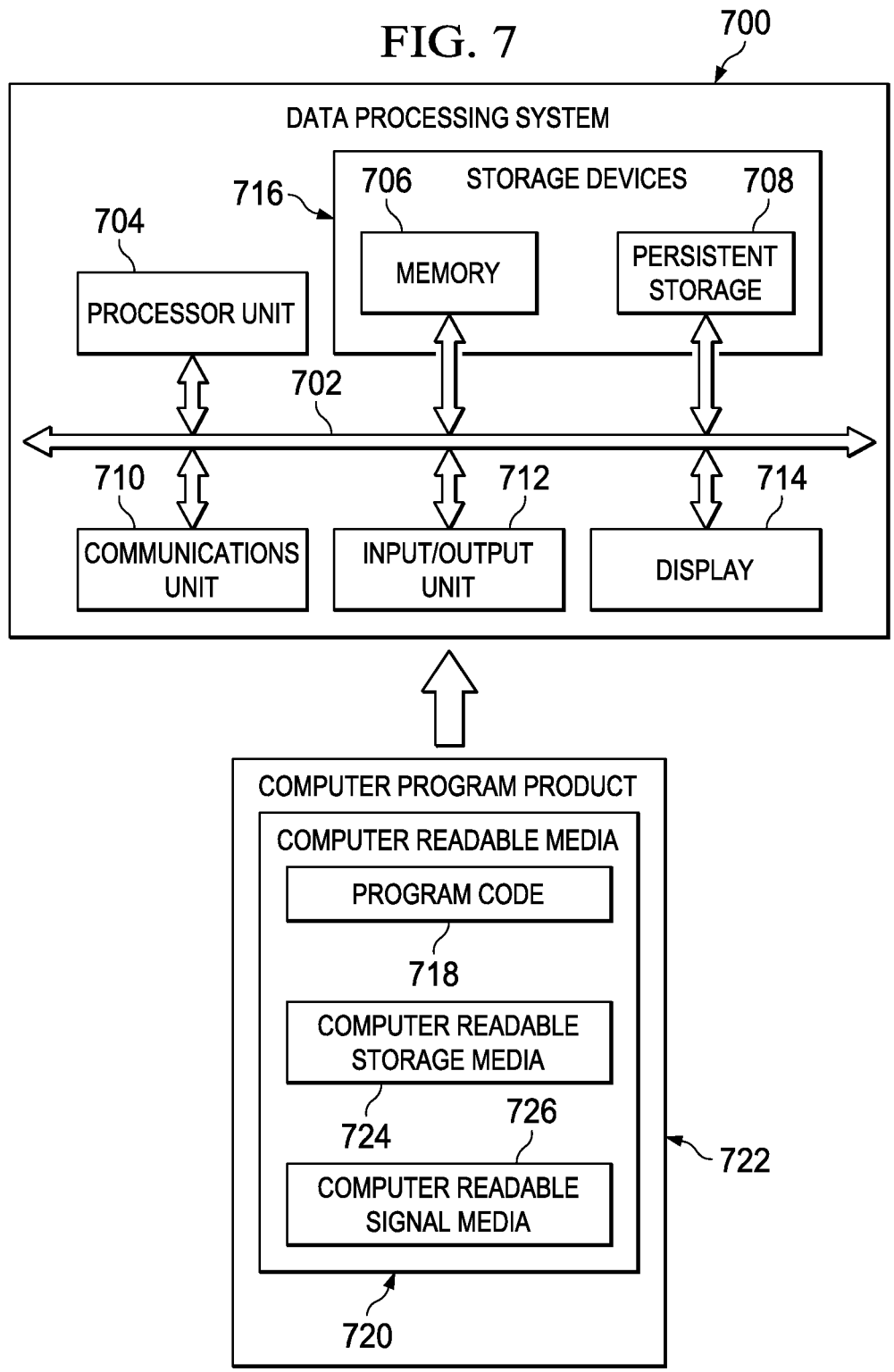

FLIGHT TRAJECTORY COMPENSATION SYSTEM FOR AIRSPEED VARIATIONS

BACKGROUND INFORMATION

1. Field

The present disclosure relates generally to aircraft and, in particular, to controlling the flight of an aircraft. Still more particularly, the present disclosure relates to a method and apparatus for compensating for airspeed variations in controlling the flight of an aircraft.

2. Background

When air flows across a wing of an aircraft, lift is generated. This lift is caused by the airfoil shape of the wing. The flow of air across the wing causes a net upward force that causes the lift for the wing.

When the airspeed of an aircraft changes, this change in airspeed may affect the lift generated for the aircraft by the wing. For example, an increase in airspeed results in an increase in lift on the wing. When an aircraft is moving in a desired trajectory, a change in airspeed may change the lift in a manner that changes the trajectory of the aircraft.

In some cases, changing the trajectory of the aircraft may be undesirable. As a result, the pilot or other operator of the aircraft may provide input through a flight stick or some other control to maintain or return the aircraft to the desired trajectory. This type of operation requires increased attention by the pilot to operate the aircraft.

When the lift changes, the pilot may be unable to perform other operations while correcting for the change in the lift. As a result, a co-pilot or other operator helps the pilot perform these other operations.

Therefore, it would be advantageous to have a method and apparatus that takes into account at least some of the issues discussed above, as well as possibly other issues.

SUMMARY

In one advantageous embodiment, a method for controlling a flight of an aircraft is provided. An undesired change in an airspeed for the aircraft is identified. A number of commands for a flight control system associated with a wing of the aircraft are identified in response to the undesired change in the airspeed. The number of commands is configured to cause the flight control system to maintain a lift of the aircraft for a desired trajectory.

In another advantageous embodiment, an apparatus comprises a lift control module. The lift control module is configured to identify an undesired change in an airspeed for an aircraft. The lift control module is configured to identify a number of commands for a flight control system associated with a wing of the aircraft. The number of commands is configured to cause the flight control system to maintain a lift of the aircraft for a desired trajectory.

In yet another advantageous embodiment, a lift control module comprises a speed command processor, an airspeed change monitor, and a lift change compensation process. The speed command processor is configured to identify an expected change in an airspeed for an aircraft. The airspeed change monitor is configured to identify an undesired change in the airspeed for the aircraft using a current airspeed for the aircraft and a previous airspeed identified for the aircraft. The undesired change in the airspeed for the aircraft takes into account the expected change in the airspeed for the aircraft. The lift change compensation process is configured to identify a change in lift for the aircraft that corresponds to the undesired change in the airspeed for the aircraft identified by the airspeed change monitor.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives, and advantages thereof, will best be understood by reference to the following detailed description of an advantageous embodiment of the present disclosure when read in conjunction with the accompanying drawings, wherein:

FIG. 7 is an illustration of a data processing system in accordance with an advantageous embodiment.

DETAILED DESCRIPTION

The different advantageous embodiments recognize and take into account a number of different considerations. For example, the different advantageous embodiments recognize and take into account that changes in lift caused by changes in airspeed may be undesirable if the change in lift results in a change in the desired trajectory for the aircraft. The trajectory is the path through airspace along which the aircraft flies. This path may be defined as the path the aircraft follows through space as a function of time. The different advantageous embodiments recognize and take into account that a change in the trajectory may be more undesirable when the operator of an aircraft is performing an operation with the aircraft that requires maintaining the aircraft on a desired trajectory as close as possible.

For example, the different advantageous embodiments recognize and take into account that one situation in which maintaining a trajectory may be desirable is when an aircraft descends on a glide slope. The glide slope is also referred to as a glide path. This type of descent is typically performed when an aircraft approaches a runway.

Another example in which it is desirable to maintain a trajectory is during landing when the aircraft performs a flare operation. A flare operation for an aircraft increases an angle of attack and may be performed to allow the aircraft to settle onto the runway.

The different advantageous embodiments recognize and take into account that another example of an instance in which a desired trajectory should be maintained with higher levels of precision as compared to other times is during a refueling operation. A pilot of a tanker aircraft flies this aircraft, while another operator performs operations to position a drogue to allow a target aircraft to connect to the drogue and receive fuel. Maintaining the position of a drogue or steering a drogue to another position when the drogue, with respect to the target aircraft, may be made more difficult if a trajectory of the tanker aircraft is not maintained.

Therefore, the different advantageous embodiments provide a method and apparatus for controlling flight of an aircraft. A change in speed of the aircraft is identified. A number of commands are identified for a flight control system associated with a wing of the aircraft. The number of commands is configured to cause the flight control system to maintain a lift of the aircraft for a desired trajectory.

Figure 1:
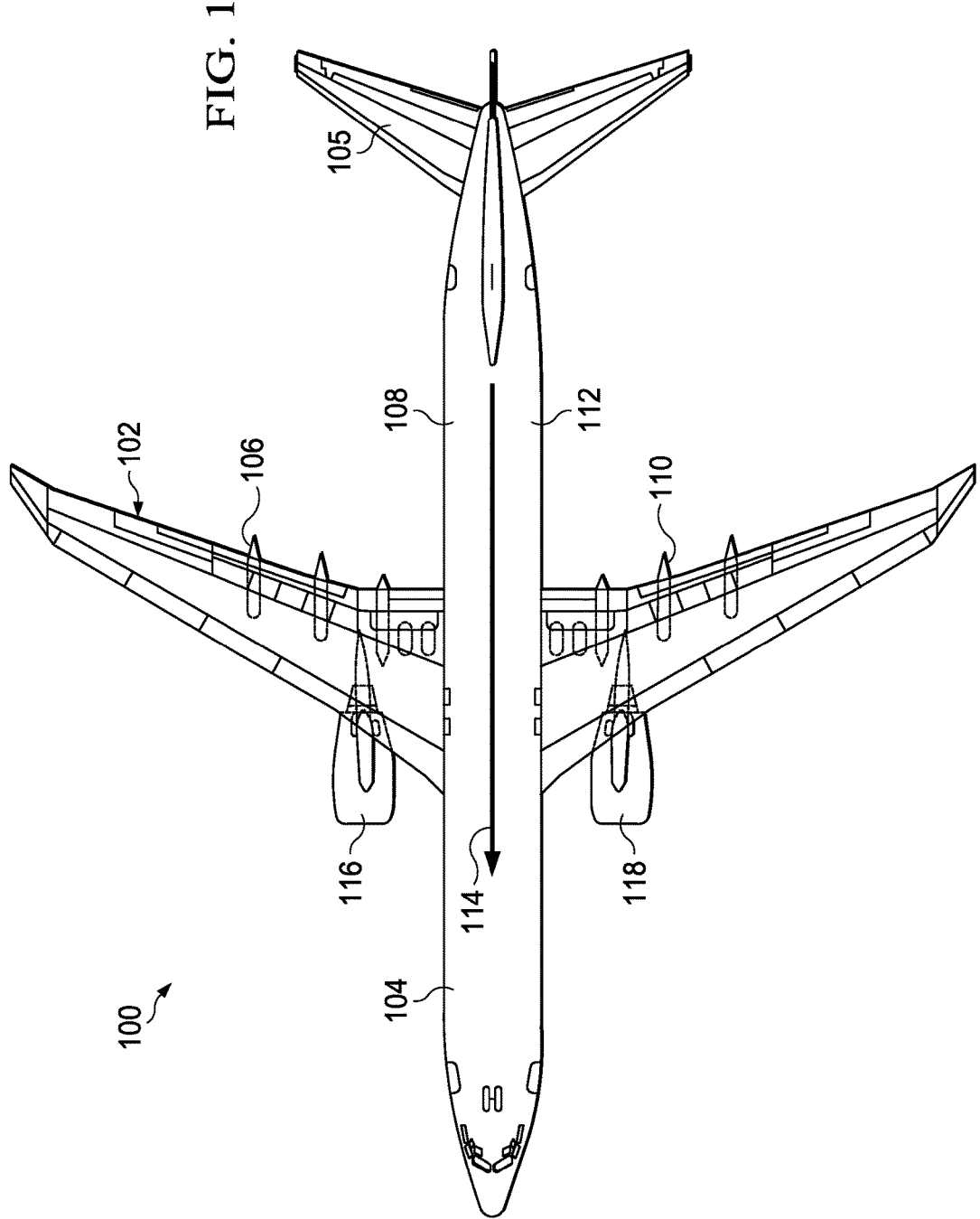
FIG. 1 is an illustration of an aircraft in which an advantageous embodiment may be implemented.

With reference now to the figures and, in particular, with reference to FIG. 1, an illustration of an aircraft is depicted in which an advantageous embodiment may be implemented. Aircraft 100 is an example of an aircraft in which a flight control system for controlling the flight of an aircraft may be implemented. In this illustrative example, aircraft 100 has wing 102 attached to fuselage 104. Fuselage 104 has tail 105.

Wing 102 has two sections in this illustrative example. Section 106 of wing 102 is connected to side 108 of fuselage 104, and section 110 of wing 102 is connected to side 112 of fuselage 104. In some examples, each section may be referred to as a wing, rather than as sections of wing 102.

In this illustrative example, section 106 and section 110 are symmetric about center line 114 extending through aircraft 100. In this illustrative example, center line 114 extends centrally through aircraft 100. As depicted, side 108 and side 112 of fuselage 104 are substantially symmetrical to each other about center line 114.

Engine 116 is attached to section 106 of wing 102, and engine 118 is connected to section 110 of wing 104. Engine 116 and engine 118 are arranged to be substantially symmetrical to each other about center line 114.

Figure 2:
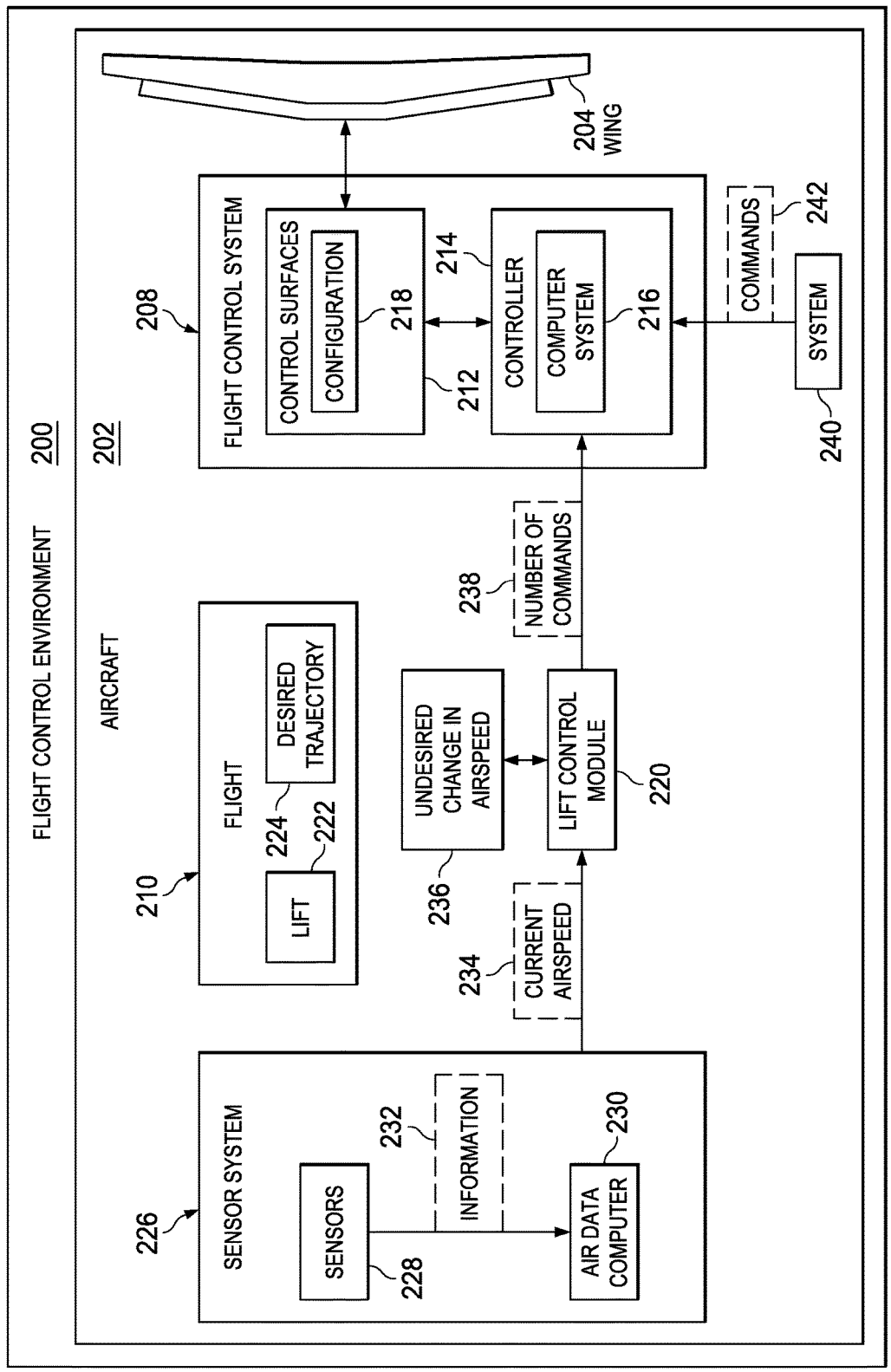
FIG. 2 is an illustration of a block diagram of a flight control environment in accordance with an advantageous embodiment.

With reference now to FIG. 2, an illustration of a block diagram of a flight control environment is depicted in accordance with an advantageous embodiment. Flight control environment 200 may be implemented using aircraft 202. Aircraft 100 in FIG. 1 is an example of one implementation for aircraft 202.

Although the illustration of aircraft 100 is for a commercial aircraft, the different advantageous embodiments may be applied to other types of aircraft. For example, flight control environment 200 may be implemented using military aircraft, non-commercial aircraft, unmanned aerial vehicles, and/or other suitable types of aircraft.

In this illustrative example, flight control system 208 is used to control flight 210 of aircraft 202. Flight control system 208 comprises control surfaces 212 and controller 214.

Control surfaces 212 are associated with wing 204, as well as other portions of aircraft 202. A first component may be considered to be associated with a second component by being secured to the second component, bonded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, control surfaces 212 may take a number of different forms. For example, without limitation, control surfaces 212 may comprise at least one of an aileron, an elevator, a rudder, a spoiler, a flap, a slat, an air brake, and other suitable types of control surfaces.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C, or item B and item C. In other examples, "at least one of" may be, for example, without limitation, two of item A, one of item B, and 10 of item C; four of item B and seven of item C; and other suitable combinations.

Controller 214 comprises a number of hardware devices and may include software. In this illustrative example, controller 214 takes the form of computer system 216 in which computer system 216 has a number of computers. A number, as used herein with reference to items, means one or more items. For example, "a number of computers" means one or more computers.

Controller 214 controls configuration 218 for control surfaces 212. Configuration 218 may be changed for control surfaces 212 by changing the position of control surfaces 212. For example, configuration 218 may be changed by changing the position of one or more of control surfaces 212 in these depicted examples. The change in configuration 218 for control surfaces 212 may be a symmetric change with respect to a center line extending through a fuselage of aircraft 202. In other words, the change in configuration 218 for control surfaces 212 may be symmetric across wing 204.

In the different illustrative examples, lift control module 220 is implemented in aircraft 202. Lift control module 220 may take the form of hardware, software, firmware, or a combination of the two. Lift control module 220 may be implemented as part of flight control system 208 or may be located as a separate system or part of some other system in aircraft 202.

In these illustrative examples, lift control module 220 is configured to maintain lift 222 for desired trajectory 224 of aircraft 202 during flight 210.

As depicted, aircraft 202 also has sensor system 226. Sensor system 226 includes sensors 228 and air data computer 230. In these illustrative examples, sensors 228 in sensor system 226 include air data sensors. Air data sensors in sensors 228 may include, for example, temperature sensors, pitot sensors, static air sensors, vanes, and/or other suitable types of sensors.

Sensors 228 generate information 232, which is used by air data computer 230. Air data computer 230 uses information 232 to identify current airspeed 234 for aircraft 202. For example, information 232 may include current airspeed 234 or other information used to derive or calculate current airspeed 234.

Further, air data computer 230 also may calculate other information, such as altitude, Mach number, and/or other suitable information using information 232 generated by sensors 228. Air data computer 230 continuously calculates current airspeed 234 in these depicted examples.

In these illustrative examples, air data computer 230 sends current airspeed 234 to lift control module 220. Lift control module 220 uses current airspeed 234 to identify whether undesired change in airspeed 236 has occurred.

When undesired change in airspeed 236 is detected, lift control module 220 identifies number of commands 238 for flight control system 208.

Controller 214 for flight control system 208 receives number of commands 238. Number of commands 238 is configured to cause flight control system 208 to control configuration 218 of control surfaces 212 to maintain lift 222 for aircraft 202 for desired trajectory 224. In this manner, number of commands 238 may be a number of positioning commands for control surfaces 212 that cause control surfaces 212 to change configuration 218.

In other illustrative examples, number of commands 238 may be commands to change lift 222 for aircraft 202. For example, a previous change in lift may have caused aircraft 202 to not maintain desired trajectory 224 during flight 210. In response, number of commands 238 may be sent to change lift 222 to maintain desired trajectory 224 for flight 210.

Further, controller 214 may also receive commands 242 from other sources other than lift control module 220. For example, controller 214 may receive commands 242 from system 240. System 240 may include at least one of an autopilot, a control stick, and other sources of commands 242 that cause a change in configuration 218 of control surfaces 212.

In the different illustrative examples, controller 214 is configured to take commands 242 into account along with number of commands 238 generated by lift control module 220 when changing configuration 218. For example, controller 214 may sum number of commands 238 with commands 242 or use some other process or mechanism to take all of these commands into account.

In this manner, the number of inputs needed to maintain desired trajectory 224 in response to changes in airspeed of aircraft 202 are reduced and/or eliminated. In other words, the operations performed by lift control module 220 reduce the number of inputs that need to be provided by the pilot or other operator of aircraft 202 to maintain desired trajectory 224 in response to changes in airspeed. In this manner, the pilot may focus on other operations for flying aircraft 202, while lift control module 220 monitors the airspeed of aircraft 202 and sends number of commands 238 to flight control system 208 to control configuration 218 for control surfaces 212.

The illustration of flight control environment 200 in FIG. 2 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in some illustrative examples, lift control module 220 may receive information 232 directly from sensors 228 and perform calculations to identify current airspeed 234 and/or undesired change in airspeed 236. In other illustrative examples, lift control module 220 may be part of air data computer 230, flight control system 208, or some other computer system in aircraft 202.

Although controller 214 has been described as a digital controller in these illustrative examples, controller 214 may take other forms. For example, controller 214 may be a mechanical controller, an analog controller, or a controller comprising any number of analog, digital, and/or mechanical components.

Figure 3:
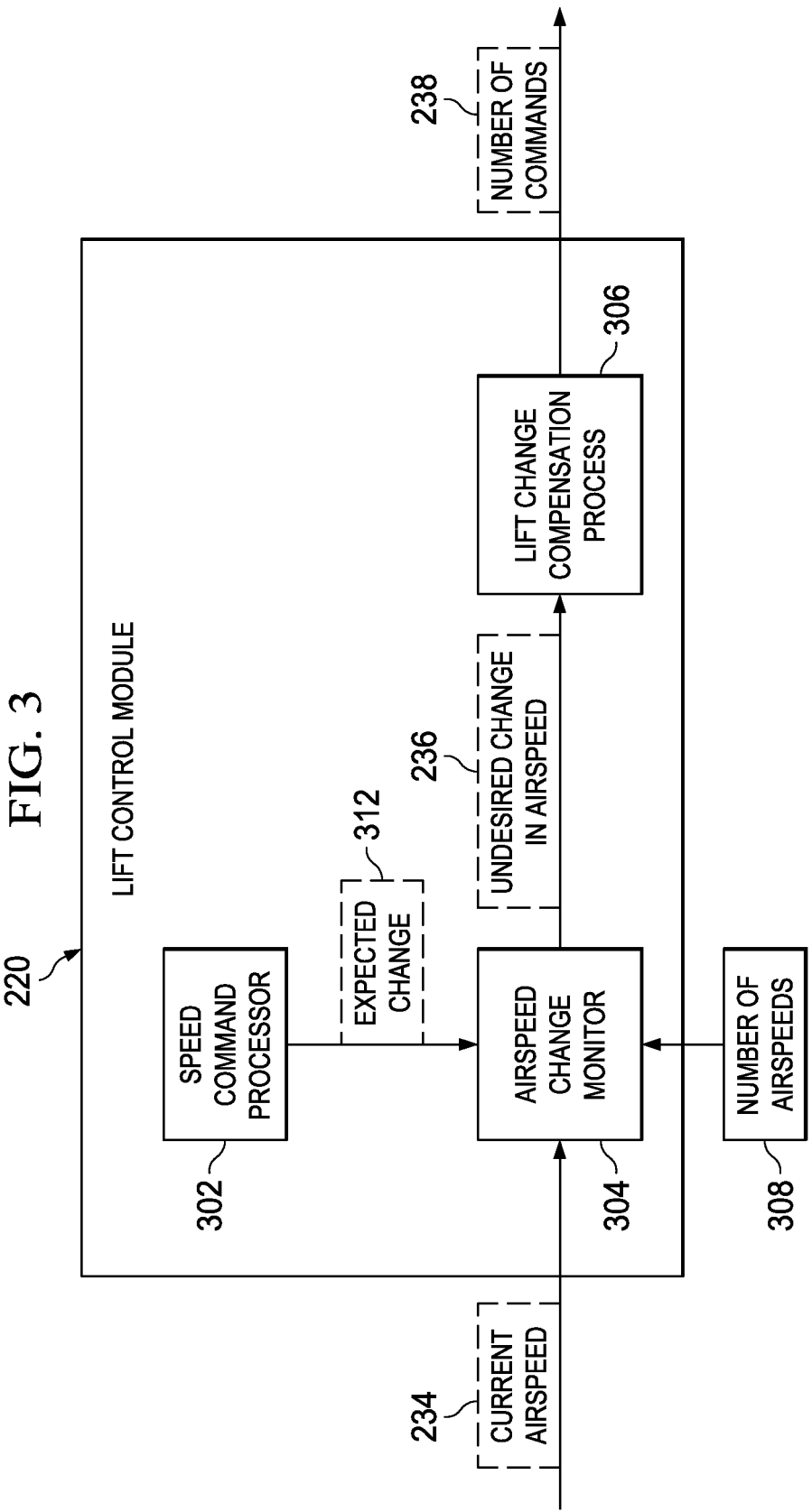
FIG. 3 is an illustration of a lift control module in accordance with an advantageous embodiment.

With reference now to FIG. 3, an illustration of a lift control module is depicted in accordance with an advantageous embodiment. As depicted in this example, lift control module 220 includes speed command processor 302, airspeed change monitor 304, and lift change compensation process 306.

The components used to implement lift control module 220 in this figure are one example of the manner in which lift control module 220 may be implemented.

Airspeed change monitor 304 receives current airspeed 234 from sensor system 226 in FIG. 2. In particular, current airspeed 234 may be received from air data computer 230 in FIG. 2.

In this illustrative example, airspeed change monitor 304 determines whether undesired change in airspeed 236 has occurred. Airspeed change monitor 304 may compare current airspeed 234 with number of airspeeds 308 to make this determination. Number of airspeeds 308 includes one or more airspeeds received at a previous point in time during flight 210 of aircraft 202. In other words, number of airspeeds 308 includes previous airspeeds. In these examples, number of airspeeds 308 is received by airspeed change monitor 304 just before current airspeed 234 is received by airspeed change monitor 304.

In some illustrative examples, any difference between current airspeed 234 and number of airspeeds 308 may be identified as undesired change in airspeed 236 and sent to lift change compensation process 306. In other illustrative examples, undesired change in airspeed 236 may be identified when the difference between current airspeed 234 and number of airspeeds 308 is greater than some selected threshold. A difference greater than the selected threshold indicates that the actual change in airspeed is undesired change in airspeed 236. In this manner, not all changes in airspeed may be identified as an undesired change.

Further, airspeed change monitor 304 may receive expected change 312 from speed command processor 302. Expected change 312 is an expected airspeed change and may be taken into account by airspeed change monitor 304 in identifying undesired change in airspeed 236. In particular, the value for the difference between current airspeed 234 and number of airspeeds 308 and the value for expected change 312 are taken into account in identifying undesired change in airspeed 236.

In other words, airspeed change monitor 304 is configured to take into account expected change 312 in identifying undesired change in airspeed 236. For example, expected change 312 may be an expected airspeed change based on a planned flight maneuver during flight 210 of aircraft 202, a current phase of flight for flight 210 of aircraft 202, and/or other suitable factors.

Speed command processor 302 generates expected change 312 based on information, such as, for example, an identification of current and/or planned maneuvers for aircraft 202, a current phase of flight 210, a weight of aircraft 202, a center of gravity for aircraft 202, an altitude, a speedbrake setting, a thrust setting, and/or other suitable types of information.

In these illustrative examples, speed command processor 302 may include first-order, second-order, and/or third-order processes for identifying expected change 312. Further, speed command processor 302 may use a timer and table containing values for expected airspeeds for aircraft 202 during flight 210. The values for these airspeeds expected for flight 210 are identified in the table identified as a function of time.

For example, if current airspeed 234 is about 300 knots and number of airspeeds 308 is one airspeed that is about 280 knots, the difference between current airspeed 234 and number of airspeeds 308 is about 20 knots. This difference may be sent as undesired change in airspeed 236 if expected change 312 is zero knots.

As another example, if expected change 312 has a value of about 20 knots, then undesired change in airspeed 236 is not identified or sent, because the difference between current airspeed 234 and number of airspeeds 308, taking into account expected change 312, is zero knots. If expected change 312 is about minus 10 knots, then undesired change in airspeed 236 is sent as about 10 knots.

In some illustrative examples, a value for undesired change in airspeed 236 may be sent after every comparison of current airspeed 234 with number of airspeeds 308 or continuously as a signal. Additionally, if an undesired change has not occurred, undesired change in airspeed 236 may have a value of about zero knots in these illustrative examples.

Lift change compensation process 306 uses undesired change in airspeed 236 to generate number of commands 238 as an output for lift control module 220. Number of commands 238 may include, for example, without limitation, a value for a desired change in lift 222 in FIG. 2. This value may be negative or positive. In some cases, lift change compensation process 306 may constantly generate a value when undesired change in airspeed 236 is sent to lift change compensation process 306 as a continuous signal. If no change in lift 222 is desired, then the value in number of commands 238 is about zero.

In other illustrative examples, number of commands 238 may take the form of values for positions for control surfaces 212 or commands for changing positions for control surfaces 212 in FIG. 2. These values or commands may cause flight control system 208 to change configuration 218 of control surfaces 212. For example, the values may be for a particular configuration or may be actual positions for control surfaces 212, depending on the particular implementation. Lift change compensation process 306 sends these values in number of commands 238 to flight control system 208 in FIG. 2.

The illustration of lift control module 220 in FIG. 3 is not meant to imply limitations to the manner in which lift control module 220 may be implemented. For example, in some advantageous embodiments, speed command processor 302 may be omitted.

In still other examples, information from sensors 228 in sensor system 226 may be directly received by lift control module 220, and airspeed change monitor 304 may calculate or identify current airspeed 234 for aircraft 202 using information 232. Lift control module 220 may then compare this calculated current airspeed 234 for aircraft 202 with previous calculations for the airspeed of aircraft 202. These previous calculations may be stored as number of airspeeds 308.

Figure 4:
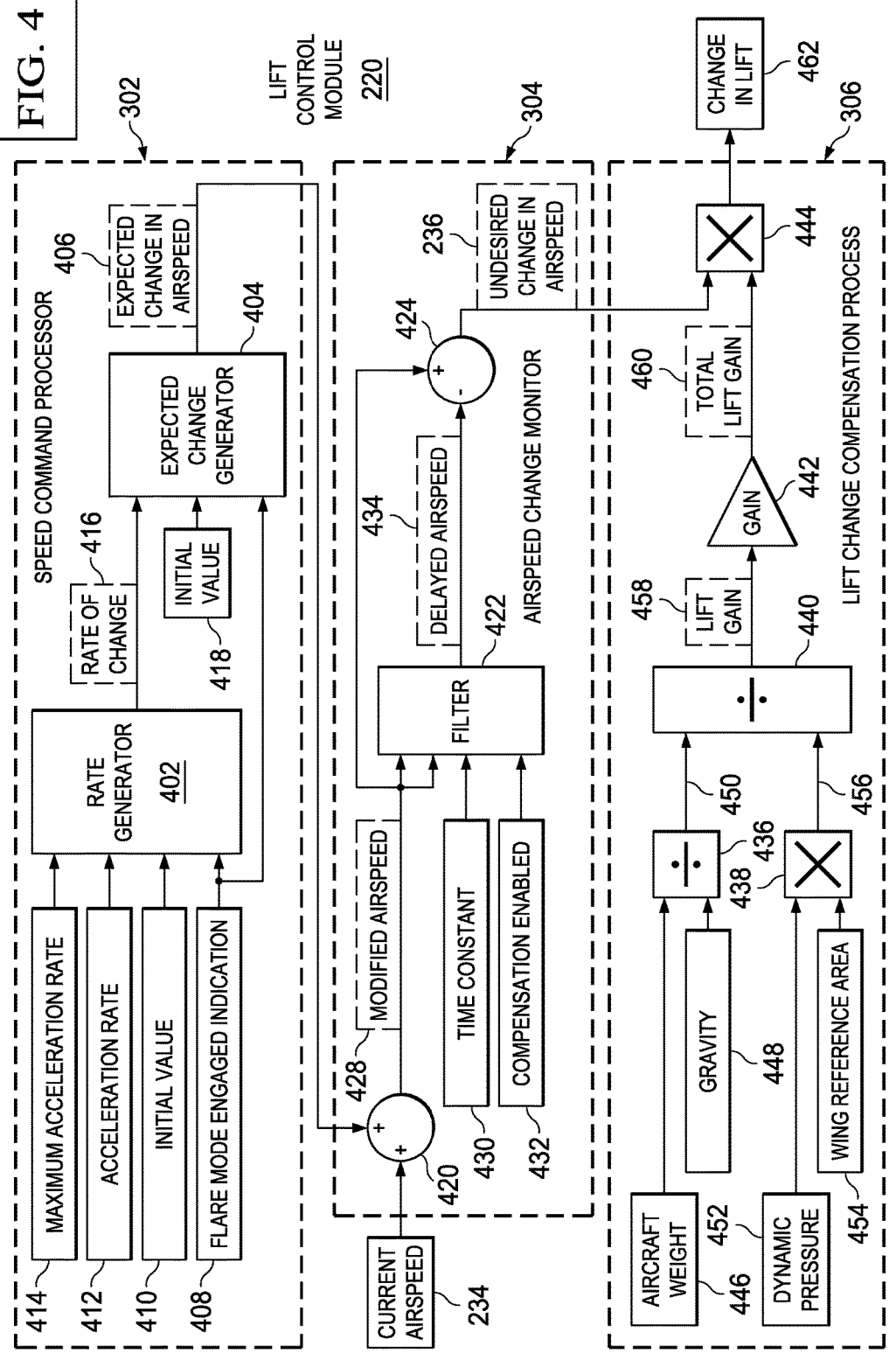
FIG. 4 is an illustration of a lift control module in accordance with an advantageous embodiment.

Turning to FIG. 4, an illustration of a lift control module is depicted in accordance with an advantageous embodiment. In this illustrative example, lift control module 220 from FIGS. 2 and 3 is depicted implemented using hardware. The implementation of lift control module 220 in this figure is an example of one manner in which lift control module 220 may be implemented.

As depicted, lift control module 220 comprises speed command processor 302, airspeed change monitor 304, and lift change compensation process 306. In this illustrative example, these components are implemented in hardware and may have a number of circuits configured to perform desired functions and/or processes. The number of circuits may include, for example, at least one of an integrated circuit, an application specific integrated circuit (ASIC), a programmable array logic, a programmable logic array, a general logic array, a field programmable gate array, a programmable logic device, a complex programmable logic device, a programmable logic controller, a macrocell array, and other suitable types of circuits.

The components depicted within speed command processor 302, airspeed change monitor 304, and lift change compensation process 306 in this figure are an example of one manner in which speed command processor 302, airspeed change monitor 304, and lift change compensation process 306 may be implemented.

In this illustrative example, airspeed change monitor 304 is configured to generate undesired change in airspeed 236. In particular, airspeed change monitor 304 uses current airspeed 234 received from sensor system 226 in FIG. 2 and expected change in airspeed 406 to generate undesired change in airspeed 236.

As depicted, speed command processor 302 is configured to identify expected change 312 in FIG. 3 in the airspeed for aircraft 202 during flight 210 in FIG. 2. Speed command processor 302 comprises rate generator 402 and expected change generator 404. In this depicted example, rate generator 402 and expected change generator 404 are configured to generate expected change in airspeed 406. Expected change in airspeed 406 is expected change 312 in the airspeed for aircraft 202 when aircraft 202 performs a flare maneuver.

Rate generator 402 and expected change generator 404 are circuits comprising logical units in this example. Rate generator 402 and expected change generator 404 are each configured to receive a number of inputs and generate an output. In particular, rate generator 402 receives flare mode engaged indication 408, initial value 410, acceleration rate 412, and maximum acceleration rate 414.

Further, rate generator 402 generates rate of change 416. Rate of change 416 is the rate of change expected for the airspeed of aircraft 202 during which aircraft 202 performs a flare maneuver. In other words, rate of change 416 is the expected acceleration of aircraft 202 during the flare maneuver.

In this illustrative example, flare mode engaged indication 408 has a value that indicates whether aircraft 202 is currently performing the flare maneuver. Initial value 410 is the initial value for rate of change 416. In this example, initial value 410 may be set to about zero. Acceleration rate 412 is the expected acceleration or rate of change for the airspeed during the flare maneuver. In this example, acceleration rate 412 may be set to about 0.5 knots per second. Further, maximum acceleration rate 414 is the maximum acceleration during the flare maneuver. In this example, maximum acceleration rate 414 may be set to about two knots per second.

When the value for flare mode engaged indication 408 indicates that aircraft 202 is not performing the flare maneuver, rate generator 402 sets the value for rate of change 416 to initial value 410. In other words, when the flare maneuver is not being performed, rate of change 416 is continuously set to about zero.

When the value for flare mode engaged indication 408 indicates that aircraft 202 is performing the flare maneuver, rate generator 402 is configured to increase the value for rate of change 416 from initial value 410 to maximum acceleration rate 414. In other words, rate generator 402 ramps the value for rate of change 416 from about zero to about two knots per second at a rate of about 0.5 knots per second.

As illustrated, expected change generator 404 is configured to generate expected change in airspeed 406 in response to receiving flare mode engaged indication 408, initial value 418, and rate of change 416. In this illustrative example, initial value 418 is set to about zero.

When the value for flare mode engaged indication 408 indicates that the flare maneuver is not being performed, expected change in airspeed 406 is set to initial value 418. In this manner, when the flare maneuver is not being performed, expected change in airspeed 406 is continuously generated having a value of about zero.

When the value for flare mode engaged indication 408 indicates that the flare maneuver is being performed, expected change generator 404 integrates rate of change 416 to generate expected change in airspeed 406 in this depicted example. Further, in this illustrative example, expected change generator 404 generates expected change in airspeed 406 as a negative value.

As depicted, airspeed change monitor 304 comprises adder 420, filter 422, and subtractor 424. Adder 420, filter 422, and subtractor 424 comprise logical units in this example. Adder 420 is configured to receive expected change in airspeed 406 and current airspeed 234. Adder 420 adds expected change in airspeed 406 and current airspeed 234 to generate modified airspeed 428. Modified airspeed 428 takes into account the expected change for the airspeed.

Filter 422 is configured to receive modified airspeed 428, time constant 430, and compensation enabled 432. Filter 422 also uses modified airspeed 428 as an initial value for filter 422. The value for time constant 430 may be set based on the desired temporal responsiveness for filter 422. The temporal responsiveness for filter 422 is how the output of filter 422 changes in response to time.

In this illustrative example, filter 422 is a first order filter configured to generate delayed airspeed 434 based on modified airspeed 428, time constant 430, and compensation enabled 432. More specifically, filter 422 performs a Laplace transform using time constant 430 and modified airspeed 428 to generate delayed airspeed 434. In other words, filter 422 provides a time delay for modified airspeed 428 such that the output of filter 422 is modified airspeed 428 previously identified.

Delayed airspeed 434 may be delayed by a period of time identified by time constant 430. For example, time constant 430 may be about five seconds. Delayed airspeed 434 is subtracted from the current modified airspeed 428 by subtractor 424 to generate undesired change in airspeed 236. In this manner, the value for time constant 430 is selected such that undesired change in airspeed 236 represents changes over a desired period of time. For example, with a greater value for time constant 430, undesired change in airspeed 236 represents changes over a longer period of time as compared to a lesser value for time constant 430.

Compensation enabled 432 has a value that indicates whether changes in lift in response to changes in airspeed are to be compensated for using lift control module 220. In other words, the value for compensation enabled 432 indicates whether compensation for changes in lift in response to changes in airspeed is desired based on desired trajectory 224 for aircraft 202 in FIG. 2.

When compensation enabled 432 has a value indicating that compensation is not desired, delayed airspeed 434 is set to the initial value for filter 422. In this example, the initial value for filter 422 is modified airspeed 428 as described above. In this manner, when compensation is not desired, subtractor 424 subtracts delayed airspeed 434 having the value for modified airspeed 428 from modified airspeed 428. In other words, when compensation is not desired, airspeed change monitor 304 continuously generates undesired change in airspeed 236 having a value of about zero.

Further, when compensation enabled 432 has a value indicating that compensation is desired, airspeed change monitor 304 generates undesired change in airspeed 236 based on current airspeed 234 for aircraft 202. Undesired change in airspeed 236 may be substantially zero when current airspeed 234 for aircraft 202 is substantially the same as a previously identified airspeed for aircraft 202 or not different from the previously identified airspeed more than expected change in airspeed 406.

In this illustrative example, undesired change in airspeed 236 has a positive value when current airspeed 234 for aircraft 202 is greater than a previous airspeed identified for aircraft 202 by more than expected change in airspeed 406. Further, undesired change in airspeed 236 has a negative value when current airspeed 234 for aircraft 202 is less than a previous airspeed identified for aircraft 202 by more than expected change in airspeed 406.

As depicted, lift change compensation process 306 is configured to receive undesired change in airspeed 236. In this illustrative example, lift change compensation process 306 comprises divider 436, multiplier 438, divider 440, gain 442, and multiplier 444.

Divider 436 is configured to receive aircraft weight 446 and gravity 448. Aircraft weight 446 is the weight of the aircraft and may be in pounds. Gravity 448 is set to a value of about 32.1740 feet per second squared. Divider 436 divides aircraft weight 446 by gravity 448 to generate result 450.

Multiplier 438 is configured to receive dynamic pressure 452 and wing reference area 454. Dynamic pressure 452 may have a value based on information 232 generated by sensor system 226 for aircraft 202 in FIG. 2. Dynamic pressure 452 may be in pounds per square foot. Wing reference area 454 may be set to a reference value for the area for wing 204 for aircraft 202 in FIG. 2. Wing reference area 454 may be in feet squared. As one example, wing reference area 454 may be set to a value of about 3,500 feet squared. Multiplier 438 multiplies dynamic pressure 452 by wing reference area 454 to generate result 456.

Further, divider 440 is configured to receive result 450 and result 456. Divider 440 divides result 450 by result 456 to generate lift gain 458. Lift gain 458 may have no units in this illustrative example.

In this illustrative example, additional lift gain 458 may be generated by sending lift gain 458 through gain 442. Gain 442 multiplies lift gain 458 may be a selected value to generate total lift gain 460. When additional lift gain 458 is not needed, gain 442 multiplies lift gain 458 by a value of one.

Multiplier 444 is configured to receive total lift gain 460 and undesired change in airspeed 236. Multiplier 444 multiplies total lift gain 460 by undesired change in airspeed 236 to generate change in lift 462. Change in lift 462 is the amount by which lift 222 changes in response to a change in the airspeed for aircraft 202.

Change in lift 462 may be included in number of commands 238 sent to flight control system 208 in FIG. 2. Flight control system 208 may control configuration 218 for control surfaces 212 for aircraft 202 based on change in lift 462.

The illustration of lift control module 220 in FIG. 4 is not meant to imply limitations to the manner in which lift control module 220 may be implemented. For example, in some advantageous embodiments, additional components may be included in speed command processor 302. These additional components may be used to identify expected change 312 in the airspeed for aircraft 202 based on aircraft 202 performing other maneuvers, other than a flare maneuver.

As one specific example, speed command processor 302 may be configured to identify expected change 312 in the airspeed for aircraft 202 based on aircraft 202 performing a tracking task, such as following a glideslope during a landing approach. The flight crew of aircraft 202 may decide to select a different target airspeed while following the glideslope. If the airspeed is being controlled by an autothrottle, the response of aircraft 202 to the new airspeed will be expected and can be programmed into speed command processor 302. With this type of situation, speed command processor 302 may need to take into account the gains and time delays in the autothrottle and the response of the engines for aircraft 202.

Figure 5:
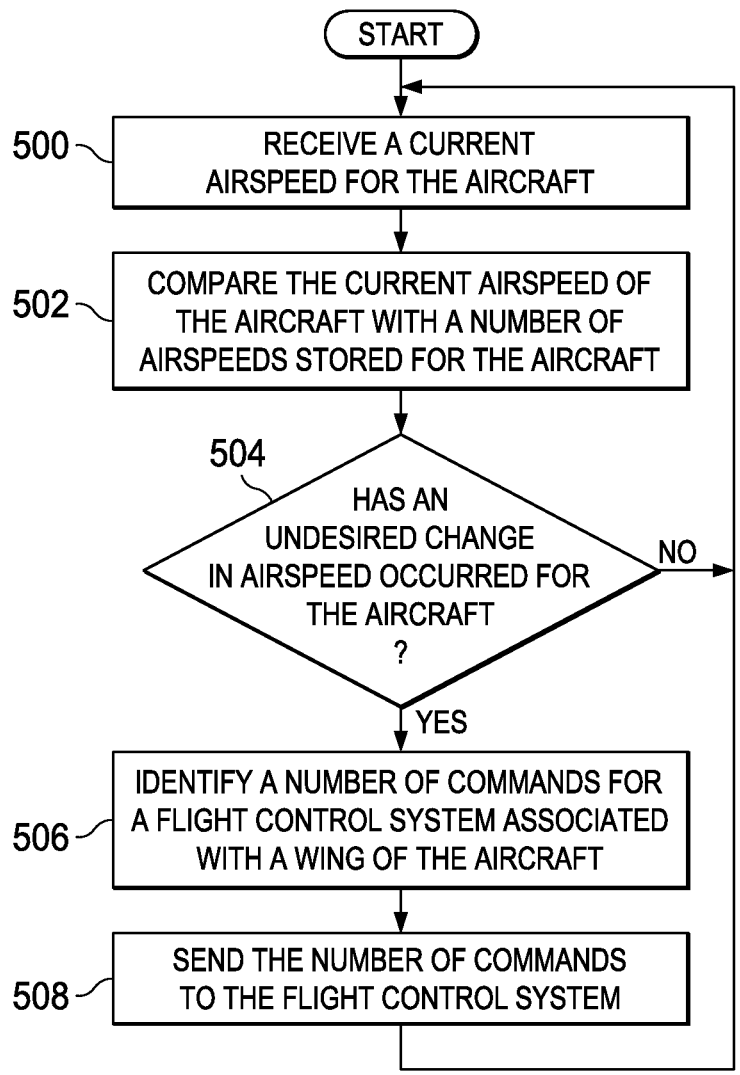
FIG. 5 is an illustration of a flowchart for controlling flight of an aircraft in accordance with an advantageous embodiment.

With reference now to FIG. 5, an illustration of a flowchart for controlling flight of an aircraft is depicted in accordance with an advantageous embodiment. The process illustrated in FIG. 5 may be implemented in aircraft 100 in FIG. 1. In particular, these processes may be implemented using lift control module 220 in FIG. 2 and/or lift control module 220 in FIG. 3.

The process begins by receiving a current airspeed for the aircraft (operation 500). The process compares the current airspeed of the aircraft with a number of airspeeds stored for the aircraft (operation 502). The number of airspeeds is a number of previously received airspeeds for the aircraft.

Thereafter, a determination is made as to whether a undesired change in airspeed has occurred for the aircraft (operation 504). If a change in the airspeed has occurred for the aircraft, a number of commands for a flight control system associated with a wing of the aircraft is identified (operation 506). The number of commands is configured to cause the flight control system to maintain a lift of the aircraft for a desired trajectory of the aircraft.

The process then sends the number of commands to the flight control system (operation 508), with the process returning to operation 500 as described above. With reference again to operation 504, if a change in the airspeed has not occurred, the process returns to operation 500 as described above.

Figure 6:
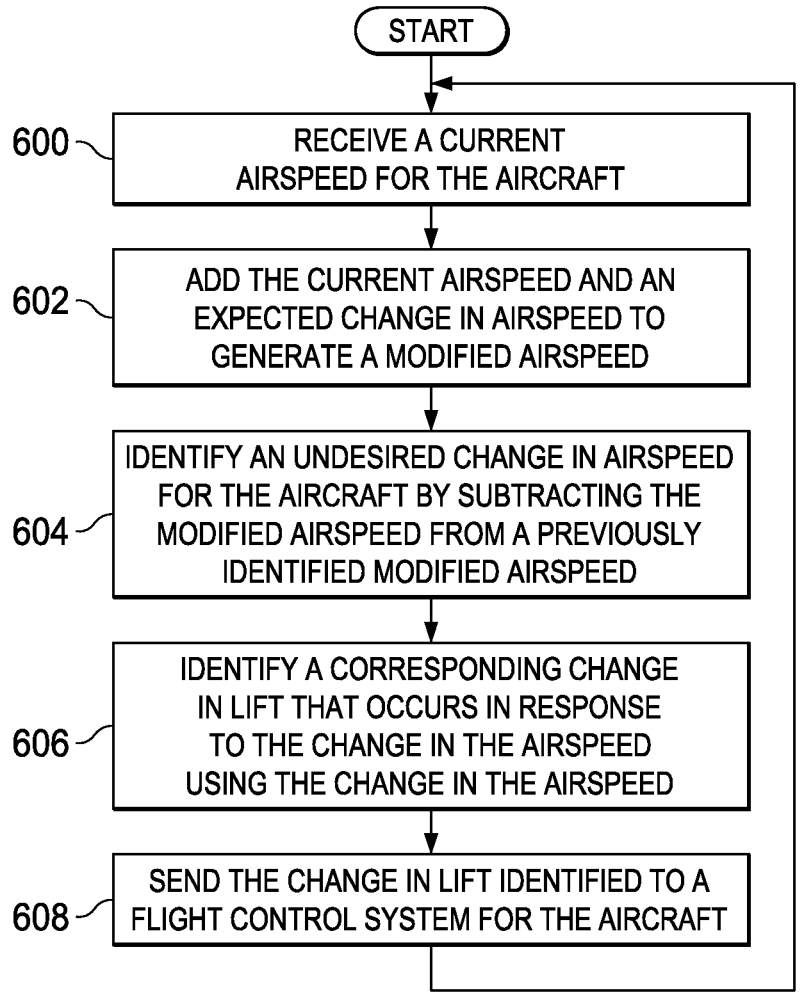
FIG. 6 is an illustration of a flowchart of a process for controlling flight of an aircraft in accordance with an advantageous embodiment.

With reference now to FIG. 6, an illustration of a flowchart of a process for controlling flight of an aircraft is depicted in accordance with an advantageous embodiment. The process illustrated in FIG. 6 may be implemented using lift control module 220 in FIG. 2 and/or lift control module 220 in FIG. 3.

The process begins by receiving a current airspeed for the aircraft (operation 600). In particular, the current airspeed may be received by airspeed change monitor 304 in FIG. 3. The process adds the current airspeed and an expected change in airspeed to generate a modified airspeed (operation 602). The expected change in airspeed may be generated by, for example, speed command processor 302 in FIG. 3. The expected change in airspeed has a value based on whether a decrease, an increase, or no change is expected in the airspeed.

Thereafter, the process identifies an undesired change in airspeed for the aircraft by subtracting the modified airspeed from a previously identified modified airspeed (operation 604). The process then identifies a corresponding change in lift that occurs in response to the change in the airspeed using the change in the airspeed (operation 606).

The process then sends the change in lift identified to a flight control system for the aircraft (operation 608), with the process then returning to operation 600 as described above.

The flight control system may use the change in lift identified to change a configuration for control surfaces for the aircraft to maintain the lift for the aircraft for a desired trajectory.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

Turning now to FIG. 7, an illustration of a data processing system is depicted in accordance with an advantageous embodiment. In this illustrative example, data processing system 700 includes communications fabric 702, which provides communications between processor unit 704, memory 706, persistent storage 708, communications unit 710, input/output (I/O) unit 712, and display 714. Data processing system 700 is an example of a data processing system that may be used to implement components in the different advantageous embodiments. For example, data processing system 700 may be used to implement at least one of computer system 216 for controller 214, lift control module 220, air data computer 230 in FIG. 2, and other suitable components. Data processing system 700 also may be used to implement one implementation of lift control module 220 in FIG. 3.

Processor unit 704 serves to execute instructions for software that may be loaded into memory 706. Processor unit 704 may be a number of processors, a multi-processor core, or some other type of processor, depending on the particular implementation. A number, as used herein with reference to an item, means one or more items. Further, processor unit 704 may be implemented using a number of heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices 716. A storage device is any piece of hardware that is capable of storing information, such as, for example, without limitation, data, program code in functional form, and/or other suitable information either on a temporary basis and/or a permanent basis. Storage devices 716 may also be referred to as computer readable storage devices in these examples. Memory 706, in these examples, may be, for example, a random access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communications links.

Input/output unit 712 allows for input and output of data with other devices that may be connected to data processing system 700. For example, input/output unit 712 may provide a connection for user input through a keyboard, a mouse, and/or some other suitable input device. Further, input/output unit 712 may send output to a printer. Display 714 provides a mechanism to display information to a user.

Instructions for the operating system, applications, and/or programs may be located in storage devices 716, which are in communication with processor unit 704 through communications fabric 702. In these illustrative examples, the instructions are in a functional form on persistent storage 708. These instructions may be loaded into memory 706 for execution by processor unit 704. The processes of the different embodiments may be performed by processor unit 704 using computer-implemented instructions, which may be located in a memory, such as memory 706.

These instructions are referred to as program code, computer usable program code, or computer readable program code that may be read and executed by a processor in processor unit 704. The program code in the different embodiments may be embodied on different physical or computer readable storage media, such as memory 706 or persistent storage 708.

Program code 718 is located in a functional form on computer readable media 720 that is selectively removable and may be loaded onto or transferred to data processing system 700 for execution by processor unit 704. Program code 718 and computer readable media 720 form computer program product 722 in these examples. In one example, computer readable media 720 may be computer readable storage media 724 or computer readable signal media 726. Computer readable storage media 724 may include, for example, an optical or magnetic disk that is inserted or placed into a drive or other device that is part of persistent storage 708 for transfer onto a storage device, such as a hard drive, that is part of persistent storage 708.

Computer readable storage media 724 also may take the form of a persistent storage, such as a hard drive, a thumb drive, or a flash memory, that is connected to data processing system 700. In some instances, computer readable storage media 724 may not be removable from data processing system 700. In these examples, computer readable storage media 724 is a physical or tangible storage device used to store program code 718, rather than a medium that propagates or transmits program code 718. Computer readable storage media 724 is also referred to as a computer readable tangible storage device or a computer readable physical storage device. In other words, computer readable storage media 724 is a media that can be touched by a person.

Alternatively, program code 718 may be transferred to data processing system 700 using computer readable signal media 726. Computer readable signal media 726 may be, for example, a propagated data signal containing program code 718. For example, computer readable signal media 726 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 718 may be downloaded over a network to persistent storage 708 from another device or data processing system through computer readable signal media 726 for use within data processing system 700. For instance, program code stored in a computer readable storage medium in a server data processing system may be downloaded over a network from the server to data processing system 700. The data processing system providing program code 718 may be a server computer, a client computer, or some other device capable of storing and transmitting program code 718.

The different components illustrated for data processing system 700 are not meant to provide architectural limitations to the manner in which different embodiments may be implemented. The different advantageous embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 704 may take the form of a hardware unit that has circuits that are manufactured or configured for a particular use. This type of hardware may perform operations without needing program code to be loaded into a memory from a storage device to be configured to perform the operations.

For example, when processor unit 704 takes the form of a hardware unit, processor unit 704 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a programmable array logic, a field programmable logic array, a field programmable gate array, and other suitable hardware devices. With this type of implementation, program code 718 may be omitted, because the processes for the different embodiments are implemented in a hardware unit.

In still another illustrative example, processor unit 704 may be implemented using a combination of processors found in computers and hardware units. Processor unit 704 may have a number of hardware units and a number of processors that are configured to run program code 718. With this depicted example, some of the processes may be implemented in the number of hardware units, while other processes may be implemented in the number of processors.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of devices that transmit data, receive data, or transmit and receive data. A communications unit may be, for example, a modem or a network adapter, two network adapters, or some combination thereof. Further, a memory may be, for example, memory 706, or a cache, such as found in an interface and memory controller hub that may be present in communications fabric 702.

Thus, the different advantageous embodiments provide a method and apparatus for controlling the flight of an aircraft. In one advantageous embodiment, an undesired change in an airspeed of the aircraft is identified. A number of commands for a flight control system associated with a wing of the aircraft is identified in response to the undesired change in airspeed, wherein the number of commands is configured to cause the flight control system to maintain a lift of the aircraft for a desired trajectory. The number of commands may be sent to the flight control system to maintain the lift for the desired trajectory.

With one or more of the different advantageous embodiments, the desired trajectory may be maintained for the aircraft without a pilot or other operator providing input to maintain the desired trajectory. In this manner, one or more of the advantageous embodiments may compensate for changes in lift that may result from changes in airspeed of the aircraft. Also, the pilot may focus more on other operations or tasks in operating the aircraft.

The description of the different advantageous embodiments has been presented for purposes of illustration and description and is not intended to be exhaustive or limited to the embodiments in the form disclosed. Many modifications and variations will be apparent to those of ordinary skill in the art. Further, different advantageous embodiments may provide different advantages as compared to other advantageous embodiments.

The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus comprising:
    a lift control module configured to identify an undesired change in an airspeed for an aircraft; and further configured to identify a number of commands for a flight control system associated with a wing of the aircraft, wherein the number of commands is configured to cause the flight control system to maintain a lift of the aircraft for a desired trajectory while minimizing change in pitch attitude, and wherein the lift control module further comprises:
    an airspeed change monitor configured to identify the undesired change in the airspeed using a current airspeed and a previous airspeed for the aircraft; and
    a lift change compensation process in communication with the airspeed change monitor and configured to receive the undesired change in the airspeed, identify a change in the lift in response to the undesired change in the airspeed, and identify the number of commands configured to cause the flight control system to maintain the lift of the aircraft for the desired trajectory while minimizing change in pitch attitude.

2. The apparatus of claim 1, wherein the lift control module further comprises:
    a speed command processor configured to identify an expected change in the airspeed for the aircraft, wherein the airspeed change monitor is configured to identify the undesired change in the airspeed using the current airspeed, the previous airspeed, and the expected change in the airspeed for the aircraft.

3. The apparatus of claim 1, wherein the number of commands is selected from at least one of a change in the lift and a number of positioning commands for a number of control surfaces in the flight control system.

4. The apparatus of claim 1 further comprising:
    a sensor system comprising sensors in which the sensors are configured to generate information and wherein the lift control module is configured to identify a current airspeed for the aircraft using the information.

5. The apparatus of claim 1, wherein in being configured to identify the change in the lift in response to the undesired change in the airspeed, the lift change compensation process is configured to identify the change in the lift in response to the undesired change in the airspeed using a weight of the aircraft, dynamic pressure, gravity, a wing reference area, and the undesired change in the airspeed.

6. The apparatus of claim 1, wherein the lift control module comprises at least one of hardware, software, and firmware.

7. The apparatus of claim 1 further comprising:
    the flight control system, wherein the flight control system is configured to change a configuration of a number of control surfaces on the aircraft using the number of commands to maintain the lift of the aircraft for the desired trajectory while minimizing change in pitch attitude.

8. The apparatus of claim 7, wherein a change in the configuration of the number of control surfaces is a symmetric change with respect to a center line extending through a fuselage of the aircraft.

9. A lift control module comprising:
    a speed command processor configured to identify an expected change in an airspeed for an aircraft;
    an airspeed change monitor configured to identify an undesired change in the airspeed for the aircraft using a current airspeed for the aircraft and a previous airspeed identified for the aircraft, wherein the undesired change in the airspeed for the aircraft takes into account the expected change in the airspeed for the aircraft; and
    a lift change compensation process configured to:
        identify a change in a lift for the aircraft that corresponds to the undesired change in the airspeed for the aircraft identified by the airspeed change monitor, and
        send the change in the lift for the aircraft to a flight control system for the aircraft in which the flight control system is configured to change a configuration for a number of control surfaces for the aircraft to maintain the lift for the aircraft for a desired trajectory while minimizing change in pitch attitude.

* * * * *